US011940776B2

(12) United States Patent
Sousa et al.

(10) Patent No.: US 11,940,776 B2
(45) Date of Patent: *Mar. 26, 2024

(54) METHODS AND APPARATUS FOR DETECTING AGING AND PREDICTING FAILURES IN BLDC AND PMSM MOTORS

(71) Applicant: Active-Semi, Inc., Tortola (VG)

(72) Inventors: Marc David Sousa, McKinney, TX (US); John Alexander Goodrich-Ruiz, Dallas, TX (US)

(73) Assignee: Active-Semi, Inc., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 17/860,900

(22) Filed: Jul. 8, 2022

(65) Prior Publication Data
US 2022/0342388 A1  Oct. 27, 2022

Related U.S. Application Data

(63) Continuation of application No. 16/528,444, filed on Jul. 31, 2019, now Pat. No. 11,385,621.
(Continued)

(51) Int. Cl.
*G05B 19/416* (2006.01)
(52) U.S. Cl.
CPC .. *G05B 19/416* (2013.01); *G05B 2219/41329* (2013.01)
(58) Field of Classification Search
CPC . H02P 29/00; G05B 23/0235; G05B 23/0283; G05B 19/416; G05B 2219/41329
(Continued)

(56) References Cited

U.S. PATENT DOCUMENTS 7,778,797 B2 * 8/2010 Pihlaja ............... G05B 23/0221
702/179
11,385,621 B2 * 7/2022 Sousa ..................... H02P 29/00
(Continued)

FOREIGN PATENT DOCUMENTS

EP     2051086 A2    4/2009
EP     3109649 A1    12/2016
(Continued)

OTHER PUBLICATIONS

Non-Final Office Action for U.S. Appl. No. 16/528,444, dated Nov. 23, 2021, 12 pages.
(Continued)

*Primary Examiner* — John H Le
(74) *Attorney, Agent, or Firm* — Withrow & Terranova, P.L.L.C.

(57) ABSTRACT

A system is provided that predicts motor wear and failures before they occur. Telemetry data from motors in a motor application is collected and predictive algorithms are used to determine when a motor is aging and when it may fail. Identifying a potential failure in these types of applications can help mitigate risk of other equipment failures and realize cost savings. In one example, a motor aging detection system is provided that includes one or more DC motors, and a motor controller coupled to each motor. The motor controller reads three phase currents from each motor and converts the phase currents to digital values, calculates telemetry data including applied voltages, back electric-motive force, inductance, and resistance of each motor at periodic intervals, stores this telemetry data for each motor in a memory. An age detection circuit retrieves this information from the memory and determines age factors of the motor.

20 Claims, 8 Drawing Sheets

Related U.S. Application Data

(60) Provisional application No. 62/740,422, filed on Oct. 3, 2018.

(58) Field of Classification Search
USPC .......................................................... 702/59
See application file for complete search history.

(56) References Cited

U.S. PATENT DOCUMENTS

| | | |
|---|---|---|
| 2009/0096405 A1 | 4/2009 | Flickinger et al. |
| 2009/0309530 A1 | 12/2009 | Shin |
| 2020/0110386 A1 | 4/2020 | Sousa et al. |

FOREIGN PATENT DOCUMENTS

| | | |
|---|---|---|
| JP | 2017046540 A | 3/2017 |
| WO | 2002056039 A1 | 7/2002 |

OTHER PUBLICATIONS

Notice of Allowance for U.S. Appl. No. 16/528,444, dated Mar. 8, 2022, 9 pages.
International Search Report and Written Opinion for International Patent Application No. PCT/US2019/054447, dated Dec. 4, 2019, 12 pages.

\* cited by examiner

| Time Stamp | $I_U$ | $I_V$ | $I_W$ | $V_U$ | $V_V$ | $V_W$ | Induct. (Ind) | Resist. (R) | Back EMF |
|---|---|---|---|---|---|---|---|---|---|
| Time 1 | $I_{U1}$ | $I_{V1}$ | $I_{W1}$ | $V_{U1}$ | $V_{V1}$ | $V_{W1}$ | Ind1 | R1 | EMF1 |
| Time 2 | $I_{U2}$ | $I_{V2}$ | $I_{W2}$ | $V_{U2}$ | $V_{V2}$ | $V_{W2}$ | Ind2 | R2 | EMF2 |
| Time 3 | $I_{U3}$ | $I_{V3}$ | $I_{W3}$ | $V_{U3}$ | $V_{V3}$ | $V_{W3}$ | Ind3 | R3 | EMF3 |
| Time 4 | $I_{U4}$ | $I_{V4}$ | $I_{W4}$ | $V_{U4}$ | $V_{V4}$ | $V_{W4}$ | Ind4 | R4 | EMF4 |
| ⋮ | | | | | | | | | |
| Time n | $I_{Un}$ | $I_{Vn}$ | $I_{Wn}$ | $V_{Un}$ | $V_{Vn}$ | $V_{Wn}$ | Indn | Rn | EMFn |

HISTORICAL DATA
MOTOR(x)

FIG. 7 ary data from the memory and calculate aging factors associated with each motor. The supervisor also includes a communication interface that notifies an external system of the aging factors and potential motor failures associated with one or more motors.

In an embodiment, a method is provided that includes acquiring telemetry data associated with a motor, computing aging factors for the motor from the telemetry data, determining failure conditions based on the aging factors, and outputting a notification based on the failure conditions.

In an embodiment, an apparatus is provided that includes a polling circuit that acquires telemetry data associated with a motor, an age factor detection circuit that computes aging factors for the motor from the telemetry data and determines failure conditions based on the aging factors, and a notification circuit that outputs a notification based on the failure conditions.

Further details and embodiments are described in the detailed description below. This summary does not purport to define the invention. The invention is defined by the claims.

METHODS AND APPARATUS FOR DETECTING AGING AND PREDICTING FAILURES IN BLDC AND PMSM MOTORS

CROSS-REFERENCE TO RELATED APPLICATIONS

This application is a continuation of U.S. patent application Ser. No. 16/528,444 filed Jul. 31, 2019, now U.S. Pat. No. 11,385,621, which claims the benefit of provisional patent application Ser. No. 62/740,422, filed on Oct. 3, 2018, entitled "Methods and Apparatus for Detecting Aging and Predicting Failures in BLDC and PMSM Motors," the disclosures of which are incorporated herein by reference in their entireties.

TECHNICAL FIELD

The present invention relates generally to motor control, and in particular to detecting motor characteristics and aging factors for use in failure prediction.

BACKGROUND INFORMATION

Brushless DC (BLDC) motors and Permanent Magnet Synchronous Motors (PMSM) are used in many different types of applications. These types of motors require Electronic Control (EC) in order to control the motor speed, acceleration, torque, and other features of the motor in each application.

Over the lifetime of these types of motors, both the motor and the components used in the electronic control for the motor may wear and eventually fail. A failure in the motor may have significant safety and cost impact for the application. For example, a failure in a telecom or server fan in a data center may cause the server to overheat and fail. Unfortunately, these types of hard failures can occur without notice, which can create repair emergencies that need immediate attention. These emergencies can be costly in terms of system downtime and equipment costs. Planning for these types of failures may require many pieces of redundant equipment, which may significantly increase cost.

Therefore, it is desirable to have a mechanism that provides failure predictions for BLDC and PMSM systems, thereby allowing corrective action to be taken before hard failures occur.

SUMMARY

A motor aging detection system predicts motor wear and failures before hard failures happen. In various exemplary embodiments, the motor aging detection system collects telemetry data from motors in a motor application and uses predictive algorithms to determine when a motor and/or its associated components may be aging and when a failure may occur. Identifying a potential failure in these types of applications can help mitigate risk of other equipment failures and realize cost savings.

In an exemplary embodiment, an apparatus is provided that includes one or more DC motors, and a motor controller having three (3) phase connections to each motor. The motor controller reads three phase currents from each motor and converts the phase currents to digital values, calculates telemetry data including applied voltages, back electric-motive force (BEMF), inductance (L) and resistance (R) associated each motor at periodic intervals, stores phase currents and telemetry data for each motor in a memory, and communicates the telemetry data to a supervisor using a communications interface.

In an exemplary embodiment, a supervisor is provided for use with one or more motor controllers. The supervisor includes a communications interface to communicate with each motor controller to read telemetry data that includes motor phase current, applied voltages, BEMF, inductance (L), and resistance (R) from each motor controller. The supervisor also includes a memory that stores historical telemetry data from the one or more motor controllers, and a state machine that is able to read the historical telemetry data from the memory and calculate aging factors associated with each motor. The supervisor also includes a communication interface that notifies an external system of the aging factors and potential motor failures associated with one or more motors.

BRIEF DESCRIPTION OF THE DRAWINGS

The accompanying drawings, where like numerals indicate like components, illustrate embodiments of the invention.

FIG. 7 shows an exemplary embodiment of a historical database for use in a supervisor.

DETAILED DESCRIPTION

Reference will now be made in detail to some embodiments of the invention, examples of which are illustrated in the accompanying drawings.

Figure 1:
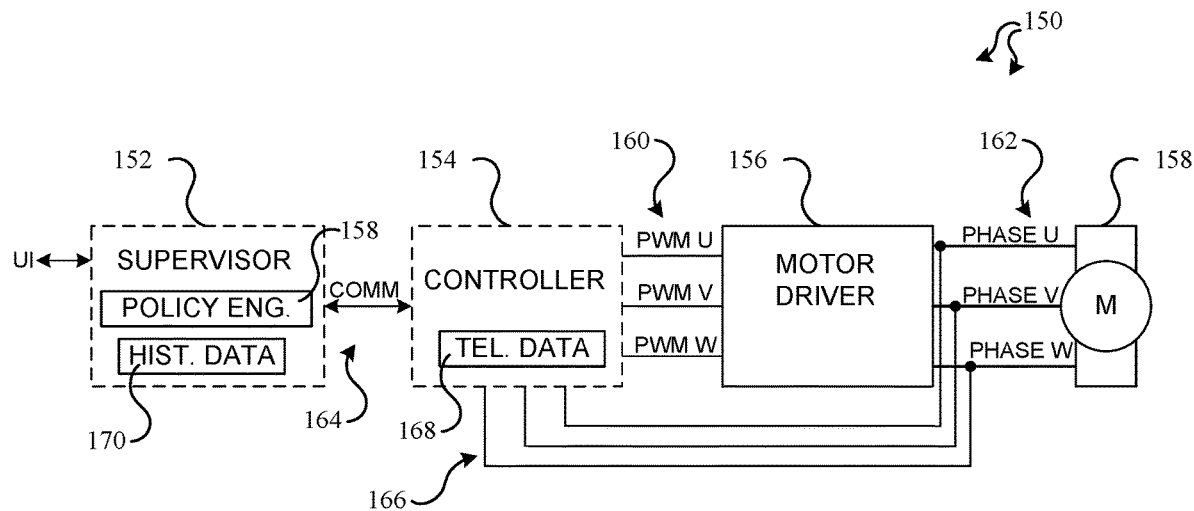
FIG. 1 is an exemplary embodiment of a motor aging detection system (MADS) for use with a motor.

FIG. 1 is an exemplary embodiment of a motor aging detection system (MADS) 150 for use with motors in a motor application. For example, the MADS 150 is suitable for use with BLDC and PMSM motors. As illustrated in FIG.

1, a motor 158 is driven by a motor driver 156 that outputs three current signals 162, typically referred to as phases U, V and W. The driver 156 energizes these three signals according to the needs of the motor in the application.

A motor controller 154 receives feedback signals 166 derived from the motor phase signals 162 and uses these feedback signals 166 to determine how to adjust the drive for the motor. The motor controller 154 may be implemented using a programmable processor or configurable digital logic. The motor controller 154 outputs low-voltage Pulse-Width-Modulated (PWM) signals 160 for the three motor phases to the driver 156, which amplifies these signals to the required voltage for use by the motor 158. The motor controller 154 and driver 156 are sometimes integrated into the same integrated circuit (IC).

In an exemplary embodiment, the motor controller 154 operates to measure and determine a plurality of motor parameters (telemetry data) 168 and stores this data in local storage. For example, the motor parameters comprise but are not limited to applied voltage, phase currents, motor resistance, motor inductance, and back EMF (electro-magnetic force).

In an exemplary embodiment, a supervisor (or management) processor 152 provides system level supervisory or management tasks. The supervisor 152 typically commands the motor controller 154 as well as implements policy decisions, provides a user interface (UI) and other similar tasks. In some embodiments, the supervisor 152, motor controller 154 and driver 156 are integrated into the same IC. In one embodiment, the IC is provided in a packaged semiconductor device having package terminals.

In an exemplary embodiment, the supervisor 152 operates to obtain the stored motor telemetry data 168 using a communication channel 164 that may be any type of wired or wireless communication channel. The supervisor 152 stores the obtained motor telemetry data 168 into a historical telemetry database 170 and uses this historical data to determine aging factors associated with the controller 154, driver 156, and motor 158. An analysis of the aging factors allows the supervisor 152 to make failure predictions indicating when potential failures of the motor or electronic control (EC) components on the printed circuit board (PCB) may occur. Failure notifications are sent through the UI. Thus, the MADS 150 operates to detect motor parameters, determine aging factors, and predict when potential failures may occur. This information can be used to conduct maintenance or other upgrades to the motor and control circuitry to avoid hard failures, reduce system downtime, and reduce repair costs.

Figure 2:
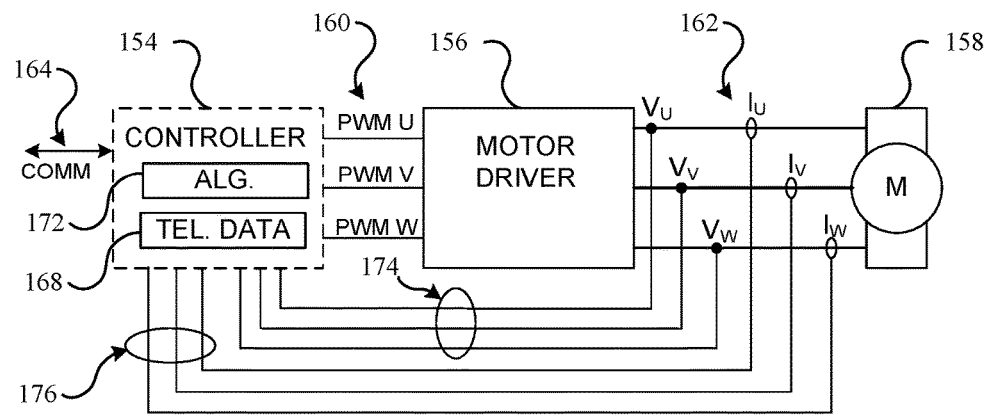
FIG. 2 shows a detailed exemplary embodiment of the motor controller, driver, and motor shown in FIG. 1.

FIG. 2 shows a detailed exemplary embodiment of the motor controller 154, driver 156 and motor 158 shown in FIG. 1. In an exemplary embodiment, the motor controller 154 includes a control algorithm 172 that generates the signals 160 to the driver 156 and samples both voltage 174 and/or current 176 applied to the motor 158 to assist in control of the motor.

In an exemplary embodiment, the algorithm 172 monitors the motor phase voltages 174 and currents 176 provided to the motor 158. Certain control algorithms use motor current and others use motor voltage as feedback to the controller 154 in order to compensate the loop to control the motor. Either voltage or current are necessary to properly control the motor.

Two popular control algorithms for BLDC and PMSM motors are Sensorless Back Electromotive Force (BEMF) and Field Oriented Control (FOC). BEMF uses the three motor phase voltages and possibly phase currents if current control is implemented. FOC uses the three phase currents for motor control.

In an exemplary embodiment, the motor controller 154 is able to process received feedback signals to generate the telemetry data 168 that is locally stored. The feedback signals comprise motor phase currents 176 and measured voltages 174. During operation, the controller 154 receives the feedback signals 174, 176 and uses one or more algorithms to process these signals to determine motor parameters, such as inductance, resistance, and/or back EMF. All of the information collected or computed by the controller 154 represents motor telemetry data 168. In an exemplary embodiment, the controller 154 responds to queries from the supervisor 152 received over the communication channel 164. In response to the queries, the controller 154 provides the locally stored telemetry data 168 to the supervisor 152 using the communication channel 164.

Figure 3:
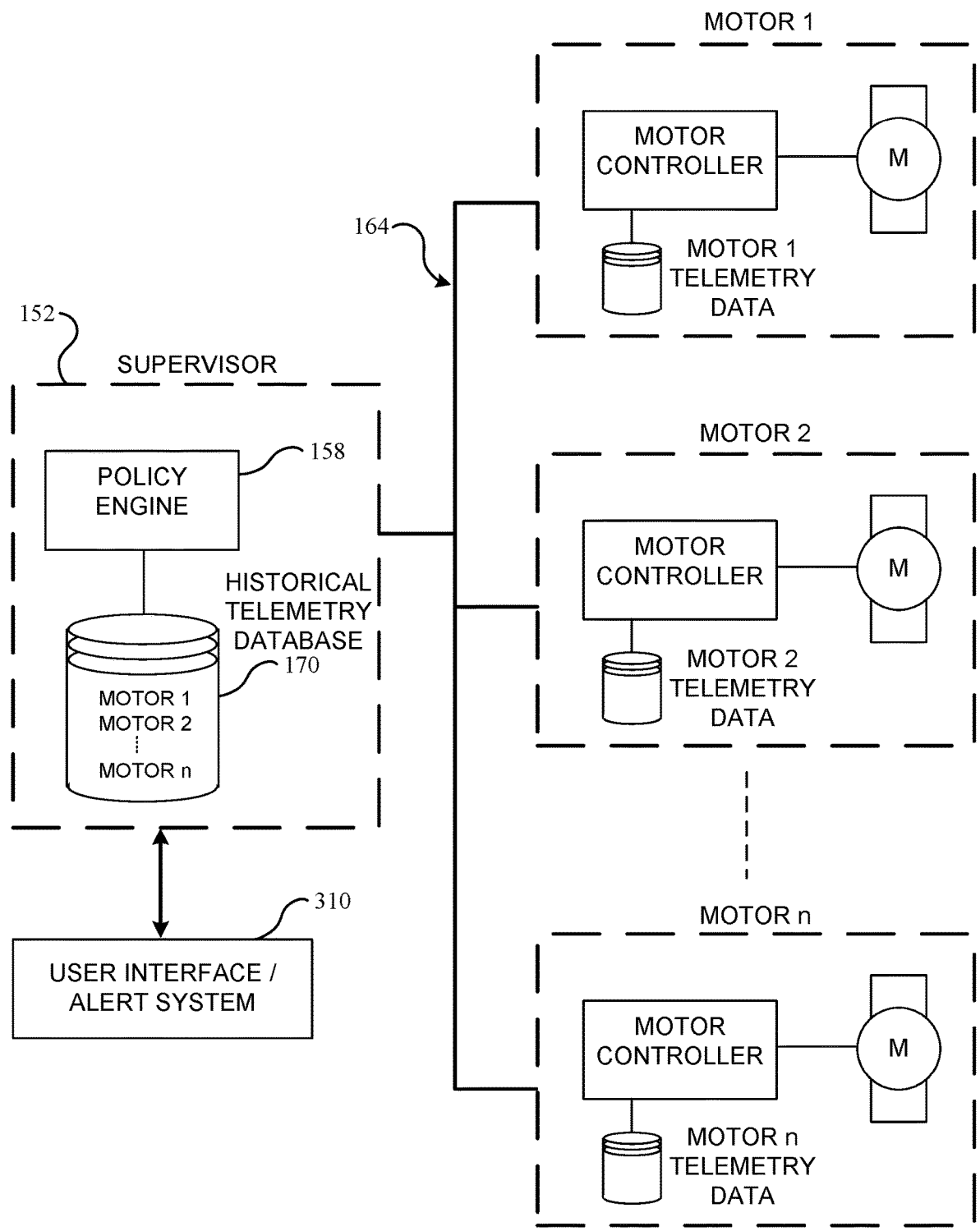
FIG. 3 shows an exemplary embodiment a supervisor coupled to control three motor controllers (1-3) that control three motors.

FIG. 3 shows an exemplary embodiment the supervisor 152 coupled to control three motor controllers (1-3) that control three motors. During operation, each motor controller collects telemetry data from its respective motor. For example, the telemetry data comprises but is not limited to the motor's resistance, inductance, flux linkage, phase current, and applied voltages. Each motor controller may also use an algorithm for identifying the motor (Motor ID) attached to it.

The Motor ID algorithm runs on the motor controller and determines the Resistance (R), Inductance (L) and BEMF constant (Ke) of the motor. This algorithm applies a voltage to stimulate the motor and reads each of the motor phase currents. The applied voltage and phase current information is then used to generate R, L, and Ke. Additionally, the phase current and voltage information that is collected can be used to detect any imbalances in the phase motor windings.

The supervisor 152 is used to manage a collection of motor controller subsystems. The supervisor 152 commands all of the motor controllers in the system, according to the application needs.

The supervisor 152 communicates with the motor controllers using the communications channel 164. The supervisor 152 periodically collects the telemetry data from each motor controller and stores it in a historical telemetry database 170. This data can then be analyzed and processed at the supervisor 152 in accordance with a policy engine 158 to determine changes in motor behavior that may indicate aging and/or pending failure through a series of algorithms. In the event that a potential failure is detected, the supervisor 152 notifies a user interface or external alert system 310 about the potential failure. Appropriate action can then be taken to repair or replace potentially bad components.

Below is a non-exhaustive list of electrical or mechanical issues that could potentially be identified by the policy engine 158.
1. Exposure to overload conditions that may damage motor windings
2. Winding shorts or contamination
3. Loose connections or broken winding connections
4. Exposure to higher than normal load conditions that would indicate mechanical wear/damage to the motor bearings/rotor/stator Intervals for Sampling Below is a list of electrical or mechanical measurements that can be identified by the policy engine 158 and their exemplary sampling intervals.
1. Motor phase current—Can be sampled at frequencies between 5 kHz and 100 kHz (200 us down to 10 us).

2. Telemetry data calculation—Can be calculated every 30 seconds to 1 minute and may generally be done with the motor off. It may also be done every few times a server fan is started or stopped (between hours and days), since motors degrade slowly.
3. System historical telemetry data analysis—generally slowly, for example, once per day or week.

Examples of Telemetry Data

Figure 4:
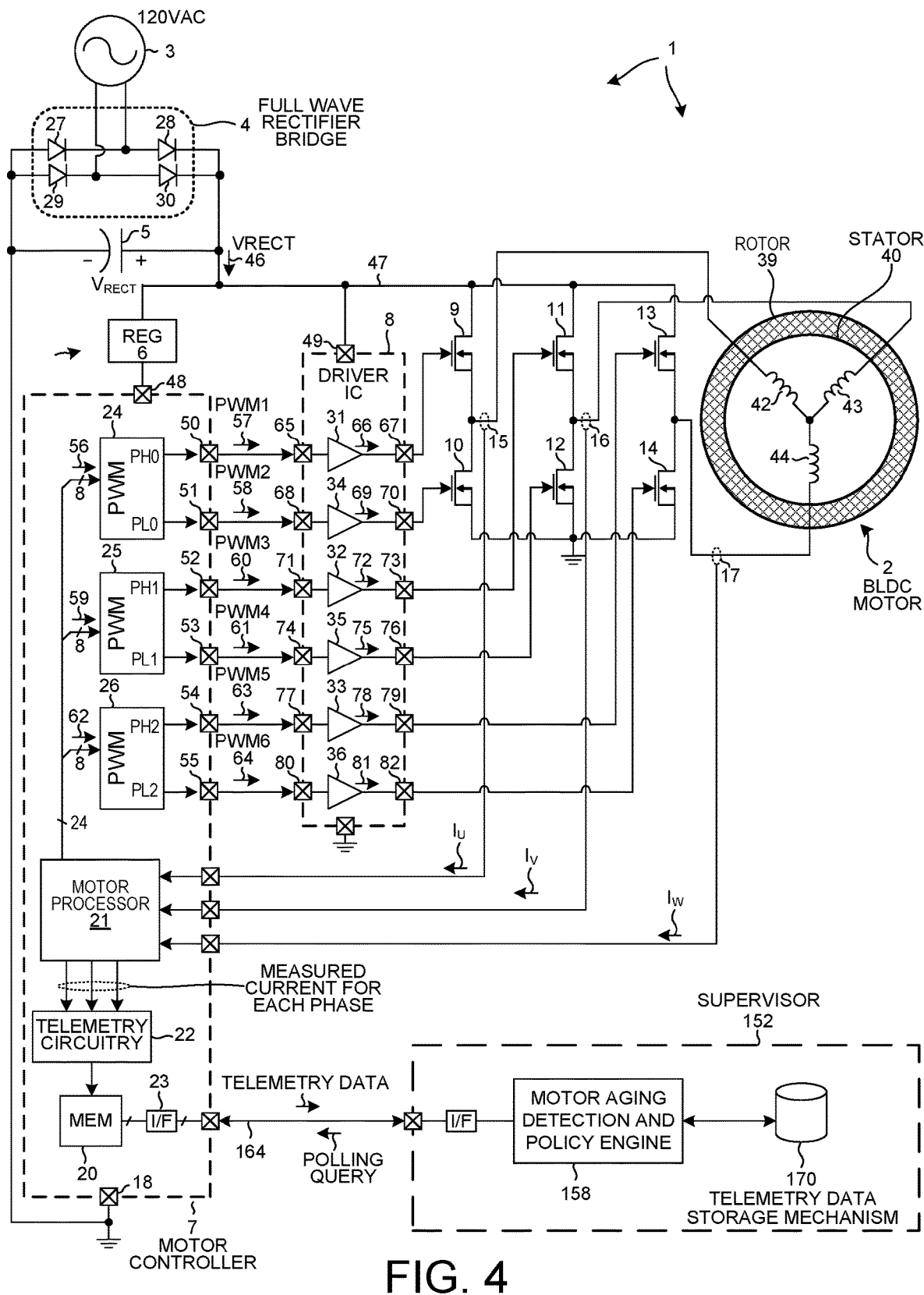
FIG. 4 is a diagram of a motor controller for use with a BLDC motor.

In various exemplary embodiments, exemplary parameters and their typical ranges for various types of BLDC motors are provided below.
1. Resistance: 50 mΩ-100Ω
2. Inductance: 0.015-500 mH
3. BEMF Constant: 0.001-0.8 Volts*sec/rad FIG. 4 is a diagram of a MADS 1 for use with a BLDC motor 2. The system 1 comprises an AC voltage source 3, a full wave rectifier bridge 4, a capacitor 5, a regulator circuit 6, a motor controller 7, a gate driver integrated circuit 8, an inverter bridge having six switching transistors 9-14, current sensor circuits 15, 16, and 17, and a ground node 18. The motor controller 7 includes a memory 20, a motor processor 21, telemetry circuitry 22, and interface circuitry 23. The full wave bridge rectifier 4 comprises diodes 27, 28, 29, and 30. The driver circuit 8 comprises high-side drivers 31, 32, and 33, and low-side drivers 34, 35, and 36. Memory 20 stores telemetry data generated by telemetry circuitry 22. Memory 20 is an example of a processor-readable medium.

The BLDC motor 2 has a rotor 39 and a stator 40. The rotor 39 has a plurality of single pole pair permanent magnets disposed adjacent to each other along the perimeter of the rotor 39. The stator 40 is a three-phase stator comprising a first stator winding 42, a second stator winding 43, and a third stator winding 44. During operation of BLDC motor 2, stator windings 42, 43, and 44 are energized so that the rotor 39 rotates around the stator 40. The stator 40 is fixed and does not rotate. In other embodiments, the rotor is in the interior and the stator is disposed on an exterior and surrounds the rotor. The BLDC motor 2 of FIG. 4 is a conceptual diagram of a simplified BLDC motor. Other BLDC motors have more than three-phases.

In operation, an incoming AC supply voltage (for example, 120 VAC) from the AC voltage source 3 is rectified by a full wave bridge rectifier 4 so that the capacitor 5 is charged. Incoming current flows into the rectifier 4, flows through one of the two diodes 28 and 30, flows into the remainder of the system 1, flows back from the remainder of the system 1, flows through one of the two diodes 27 and 29, and back to the voltage source 3. The voltage regulator circuit 6 regulates a voltage VRECT 46 on DC supply node 47. The resulting regulated supply voltage is supplied to motor controller 7 via supply terminal 48. VRECT 46 is supplied to a terminal of high side N-channel field effect transistors 9, 11, and 13, and to driver circuitry 8 via supply terminal 49.

The motor controller 7 controls the BLDC motor 2 by driving sine or square voltage signals across each of the motor windings 42, 43, and 44. The motor controller 7 outputs six pulse width modulated switch control signals PWM1-PWM6 onto PWM output terminals 50-55. The PWM circuits 24, 25, and 26 generate the PWM switch control signals PWM1-PWM6 from PWM input values received from the motor processor 21. PWM circuit 24 receives a PWM input value 56 and generates a high side PWM switch control signal PWM1 57 output onto terminal 50 and a low side PWM switch control signal PWM2 58 output onto terminal 51. The low side PWM switch control signal PWM2 58 may be an inverted version of the high side PWM switch control signal PWM1 57. PWM circuit 25 receives a PWM input value 59 and generates a high side PWM switch control signal PWM3 60 output onto terminal 52 and a low side PWM switch control signal PWM4 61 output onto terminal 53. The low side PWM switch control signal PWM4 61 may be an inverted version of the high side PWM switch control signal PWM3 60. PWM circuit 26 receives a PWM input value 62 and generates a high side PWM switch control signal PWM5 63 output onto terminal 54 and a low side PWM switch control signal PWM6 64 output onto terminal 55. The low side PWM switch control signal PWM6 64 may be an inverted version of the high side PWM switch control signal PWM5 63. In an exemplary motor driver configuration (such as 120-degree commutation used in sensorless BEMF control), the high side PWM switch control signals PWM1 57, PWM3 60, and PWM5 63 are 120° degrees out of phase with respect to each other. The low side PWM switch control signals PWM2 58, PWM4 61, and PWM6 64 are 120° degrees out of phase with respect to each other.

The PWM switch control signals PWM1-PWM6 output by the motor controller 7 drive gates of switching transistors 9-14 via driving circuitry 8. High side driver 31 receives the high side PWM switch control signal PWM1 57 via terminal 65 and supplies drive signal 66 onto gate of high side N-channel field effect transistor 9 via terminal 67. Low side driver 34 receives the low side PWM switch control signal PWM2 58 via terminal 68 and supplies drive signal 69 onto gate of low side N-channel field effect transistor 10 via terminal 70. The switch control signal PWM1 57 and the switch control signal PWM2 58 control transistors 9 and 10 to switch current through the first winding 42 of BLDC motor 2. High side driver 32 receives the high side PWM switch control signal PWM3 60 via terminal 71 and supplies drive signal 72 onto the gate of high side N-channel field effect transistor 11 via terminal 73. Low side driver 35 receives the low side PWM switch control signal PWM4 61 via terminal 74 and supplies drive signal 75 onto gate of low side N-channel field effect transistor 12 via terminal 76. The switch control signal PWM3 60 and the switch control signal PWM4 61 control transistors 11 and 12 to switch current through the second winding 43 of BLDC motor 2. High side driver 33 receives the high side PWM switch control signal PWM5 63 via terminal 77 and supplies drive signal 78 onto the gate of high side N-channel field effect transistor 13 via terminal 79. Low side driver 36 receives the low side PWM switch control signal PWM6 64 via terminal 80 and supplies drive signal 81 onto gate of low side N-channel field effect transistor 14 via terminal 82. The switch control signal PWM5 63 and the switch control signal PWM6 64 control transistors 13 and 14 to switch current through the third winding 44 of BLDC motor 2.

Figure 5:
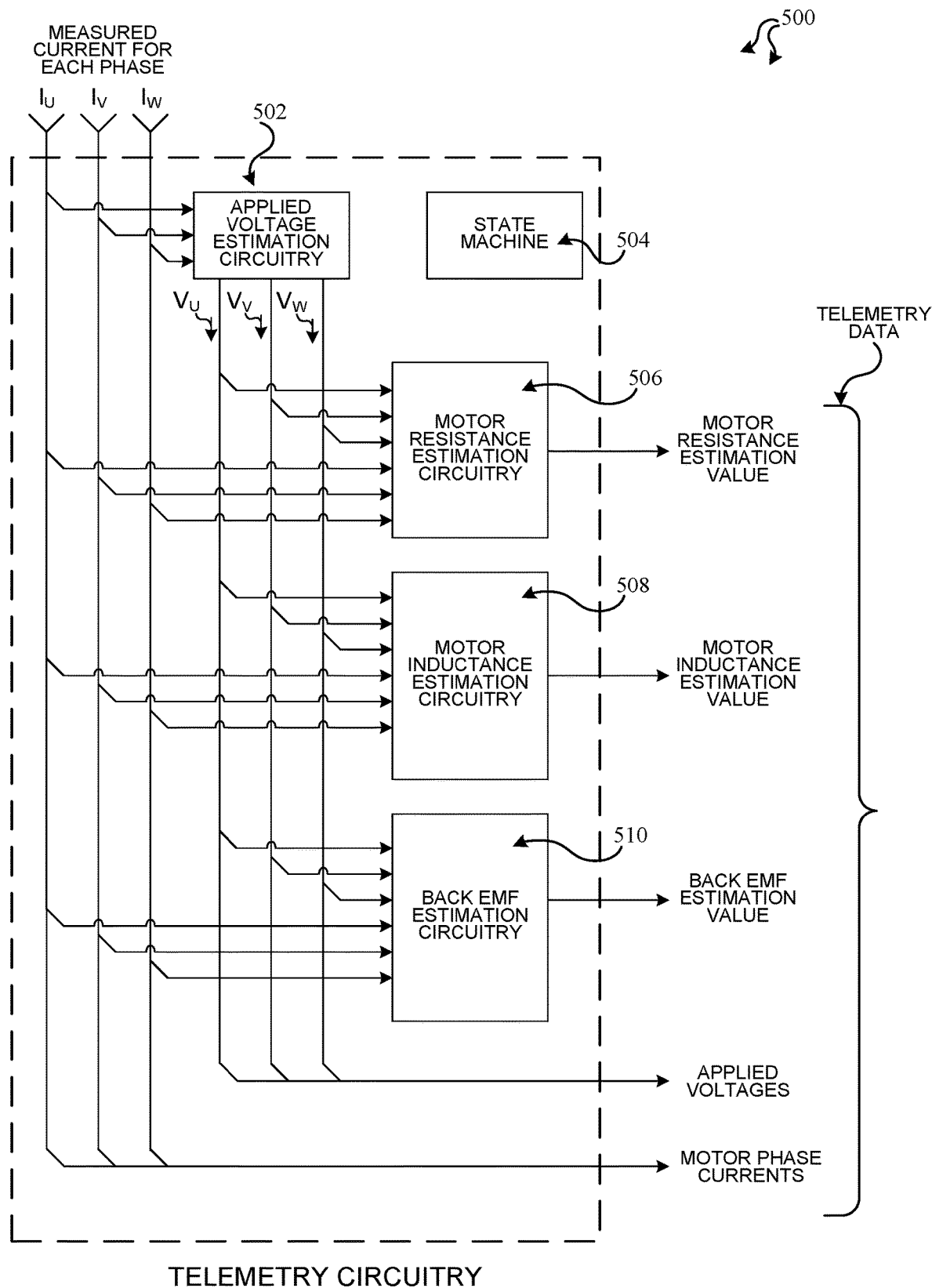
FIG. 5 shows an exemplary embodiment of a telemetry circuit for use in a motor controller.

FIG. 5 shows an exemplary embodiment of a telemetry circuit 500 for use as part of a motor controller. For example, the telemetry circuit 500 is suitable for use as the telemetry circuit 22 in the motor controller 7 to collect telemetry data as shown in FIG. 4.

In an exemplary embodiment, the telemetry circuit 500 comprises applied voltage estimation circuitry 502, state machine 504, motor resistance estimation circuitry 506, motor inductance estimation circuitry 508, and back EMF estimation circuitry 510.

The applied voltage estimation circuitry 502 measures the voltages (Vu, Vv, Vw) applied to the motor windings. These voltages are distributed to other the blocks in the telemetry circuitry 500.

The motor resistance estimation circuitry 506 measures motor resistance. The motor inductance estimation circuitry 508 measures motor inductance. The back EMF estimation circuitry 510 measures the back EMF of the motor.

In an exemplary embodiment, the state machine 504 operates to control the functional elements of the telemetry circuitry 500 to make the appropriate measurements at desired intervals and store the data in a local memory. Once the measurements have been made, the supervisor 152 can query the telemetry circuitry 500 to obtain the measurements. For example, the measurements are provided as telemetry data to the supervisor 152.

Figure 6:
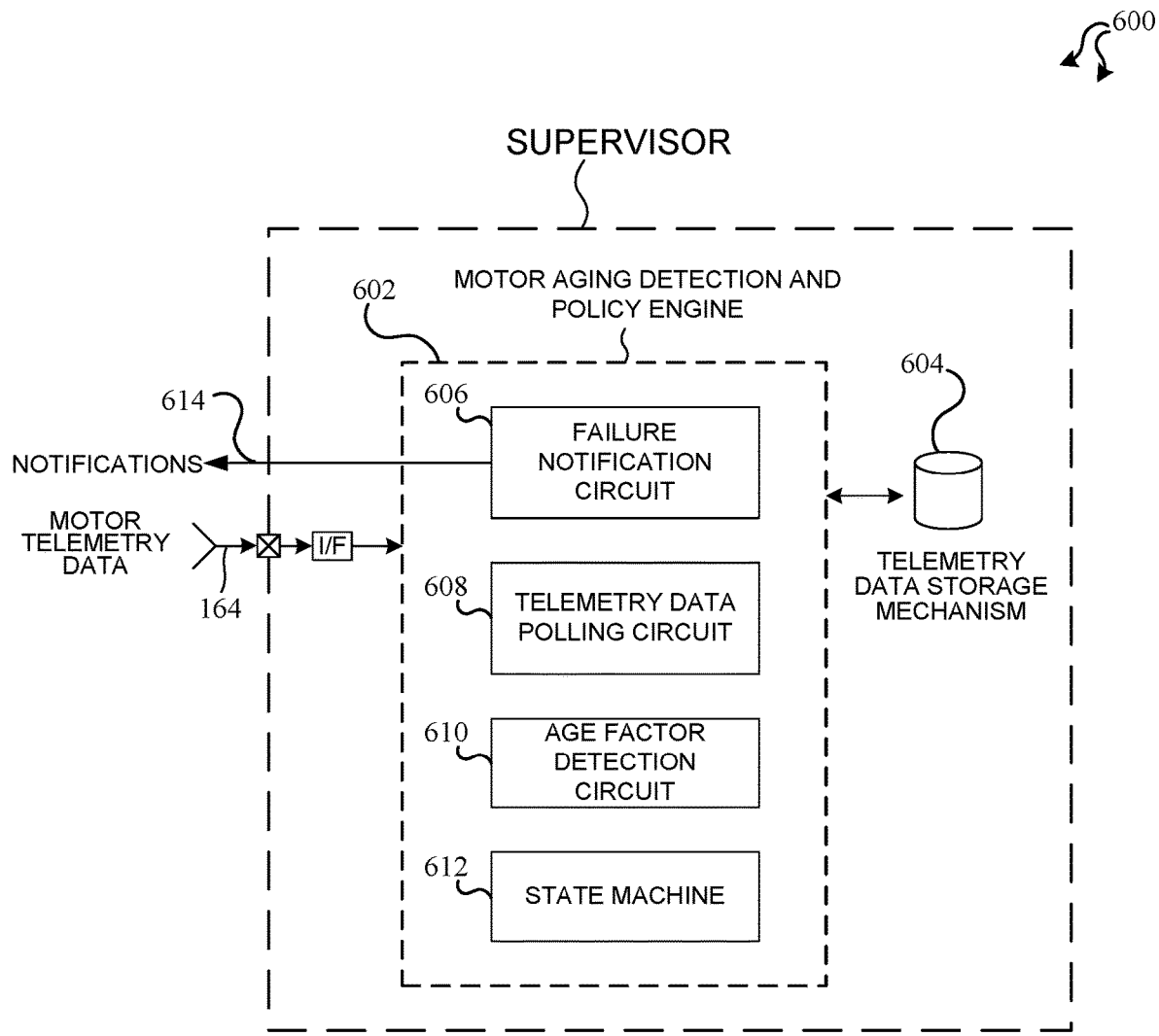
FIG. 6 shows an exemplary embodiment of a supervisor.

FIG. 6 shows an exemplary embodiment of a supervisor 600. For example, the supervisory 600 is suitable for use as the supervisor 152 shown in FIG. 4 to collect telemetry data from one or more motor controllers (such as motor controller 7 shown in FIG. 4), maintain a historical telemetry database, and analyze the historical telemetry data to determine potential failures.

In an exemplary embodiment, the supervisor 600 comprises policy engine 602 and data storage 604. The policy engine 602 comprises a failure notification circuit 606, telemetry data polling circuit 608, age factor detection circuit 610, and state machine 612.

The telemetry data polling circuit 608 operates to communicate with one or more motor controllers to poll each motor controller to receive stored telemetry data. The telemetry data that is received from each motor controller is stored in an historical telemetry database 604. The age factor detection circuit 610 operates to analyze the historical telemetry data to determine if any potential failure conditions exist. In an exemplary embodiment, the age factor detection circuit 610 analyzes the historical telemetry data using any type of algorithm or analytical process to compute age factors for the motors, their windings, or other electrical components. For example, the age factor detection circuit 610 detects changes in parameter values, such as changes in resistance, inductance, or other parameter values that indicate aging of motor components.

If the age factor detection circuit 610 determines that a potential failure may exist, the age factor detection circuit 610 indicates these conditions to the failure notification circuit 606. The failure notification circuit 606 communicates with external entities, such as user interface or other system controllers, to provide notifications 614 to those entities of potential failure conditions. The state machine 612, operates to control the functional elements of the policy engine.

FIG. 7 shows an exemplary embodiment of a historical database 700 for use in a supervisor, such as the supervisor 600. The database 700 comprises an historical record identified by timestamps 702 that are associated with phase currents 704, phase voltages 706, inductance 708, resistance 710, and back EMF 712 of a particular motor in a motor application. For example, the historical database 700 is suitable for use as the database 604 shown in FIG. 6. The historical database shows parameters for each of "n" timestamps, thereby allowing the age factor detection circuit 610 to perform calculations, such as averaging, regression analysis, etc. on any of the stored parameters for the particular motor. It should be noted that the database 700 shows parameters for only one motor but that parameters for any number of motors can be stored in the database in similar format.

Figure 8:
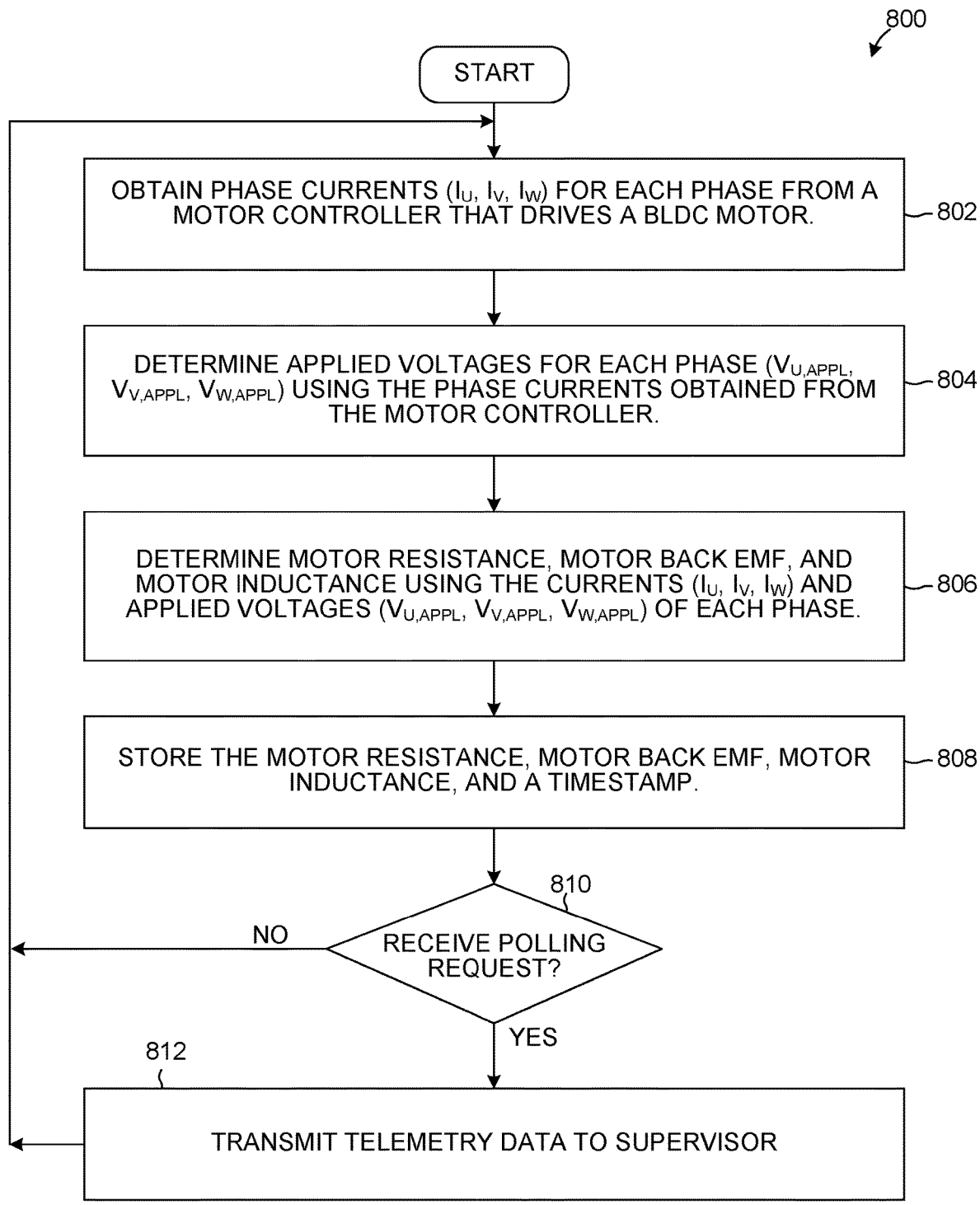
FIG. 8 shows an exemplary embodiment of a method for operating a motor controller.

FIG. 8 shows an exemplary embodiment of a method 800 for operating a motor controller, such as the motor controller 7 having a telemetry circuit 22. For example, the telemetry circuit 22 can be configured at the telemetry circuit 500 shown in FIG. 5.

At block 802, phase currents are obtained for each phase of a motor controller that drives a BLDC motor. For example, the motor processor 21 outputs measured phase current to the telemetry circuit 22.

At block 804, applied voltages for each phase are determined, for example, the applied voltage estimation circuitry 502 receives the measured phase currents and determines the applied voltages (Vu, Vv, and Vw). In another embodiment, the applied voltages are provided by the motor processor 21 to the telemetry circuit 22.

At block 806, motor resistance, back EMF, and motor inductance are determined, for example, by corresponding circuits 506, 508 and 510, based on the phase currents and the applied voltages.

At block 808, the motor resistance, back EMF, and motor inductance are stored in a memory along with a timestamp. For example, the telemetry circuit 22 stores the telemetry data in a local memory 20.

At block 810, a determination is made as to whether a polling request has been received. For example, the polling request or query is received from a supervisor, such as supervisor 152 shown in FIG. 4. If a polling request from a supervisor is received, the method proceeds to block 812. If no polling request has been received, then the method proceeds to block 802.

At block 812, in response to a polling request from a supervisor, the stored telemetry data is transmitted to the supervisor over an available communication channel. For example, in response to the poll query, the telemetry data stored in the memory 20 is transmitted over the communication channel 164 to the supervisor 152. The method then proceeds to block 802.

Figure 9:
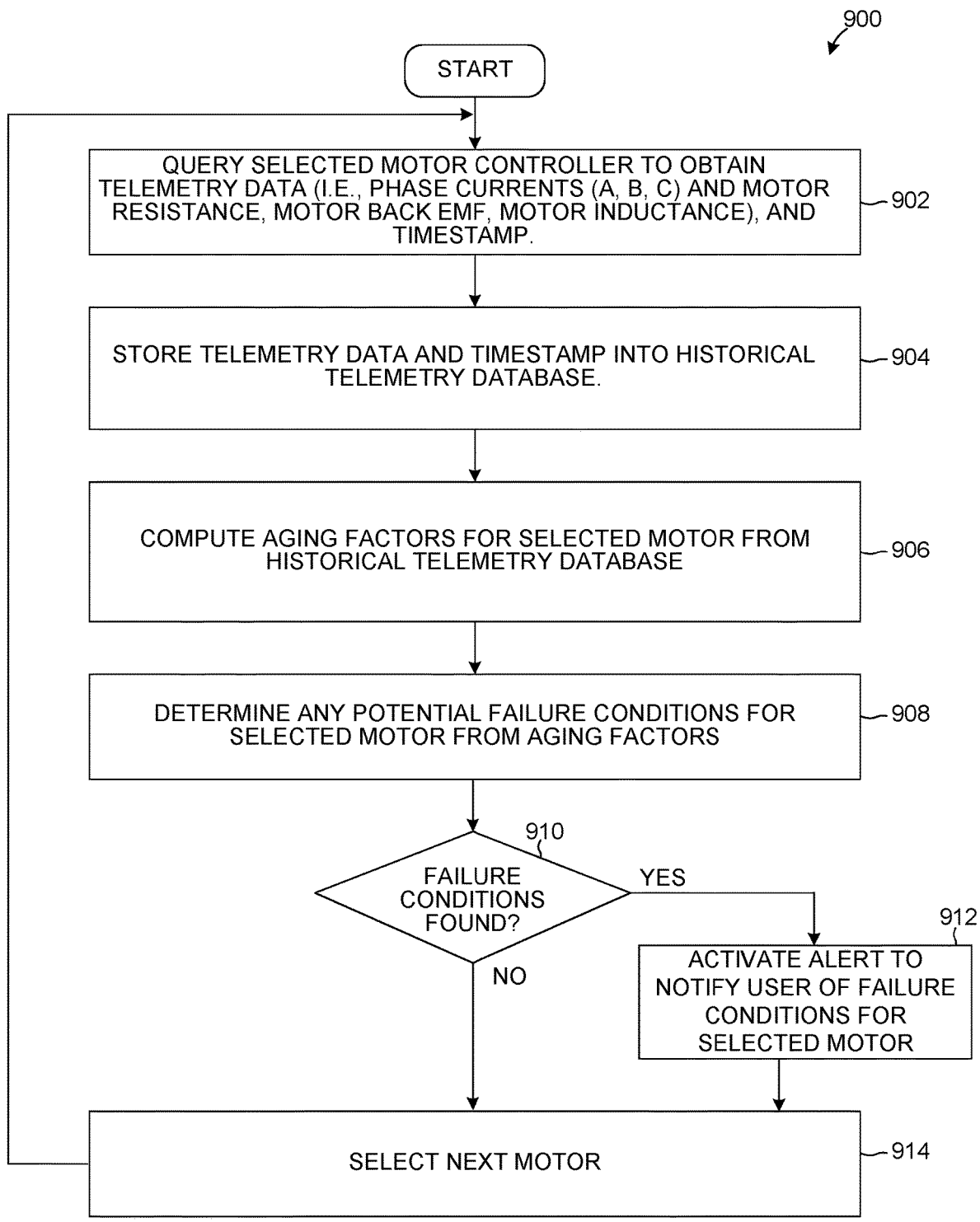
FIG. 9 shows an exemplary embodiment of a method for operating a supervisor.

FIG. 9 shows an exemplary embodiment of a method 900 for operating a supervisor, such as the supervisor 152 shown in FIG. 4. In an embodiment, the supervisor 152 is configured as the supervisor 600 shown in FIG. 6.

At block 902, a selected motor controller is queried to obtain its telemetry data. For example, the polling circuit 608 sends a poll or query the motor controller 7 using the communication channel 164.

At block 904, the received telemetry data from the selected motor controller is stored in an historical database. For example, the received telemetry data is stored in the historical database 604. In an embodiment, the telemetry data for each motor is stored as illustrated in FIG. 7.

At block 906, aging factors for the selected motor are computed from information in the historical database. For example, the age factor detection circuit 610 accesses the historical database 604 to receive a history of one or more parameters related to the selected motor and processes these parameters using any suitable algorithm or calculation to determine age factors.

At block 908, the aging factors are analyzed to determine if any potential failure conditions exist. For example, the age factor detection circuit 610 determines potential failure conditions.

At block 910, a determination is made as to whether potential failure conditions have been found. If no failure conditions have been found, then the method proceeds to block 914. If potential failure conditions have been found, then the method proceeds to block 912. For example, the age factor detection circuit 610 performs this operation.

At block 912, appropriate alerts are activated to alert a user of the potential failure conditions. For example, the failure notification circuit 606 sends out the appropriate notifications 614.

At block 914, another motor is selected for failure condition analysis. The method then proceeds to block 902.

Although certain specific embodiments are described above for instructional purposes, the teachings of this patent document have general applicability and are not limited to the specific embodiments described above. The function of the hardware circuitry illustrated in the figures can be implemented in hardware circuitry as shown, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A method comprising:
   (a) acquiring telemetry data from a motor controller associated with a motor by a state machine of a policy engine, wherein the telemetry data comprises motor parameters and timestamps associated with the motor parameters;
   (b) computing aging factors by the state machine of the policy engine for the motor from the telemetry data, wherein the computing of the aging factors comprises performing an averaging analysis or a regression analysis from the motor parameters and the timestamps associated with the motor parameters;
   (c) determining failure conditions of the motor by the state machine of the policy engine based on the aging factors;
   (d) outputting a notification to a user interface based on the failure conditions; and
   (e) repeating the operations of (a), (b), (c), and (d) at selected time intervals.

2. The method of claim 1, further comprising:
   (f) querying the motor controller coupled to the motor to acquire the telemetry data, wherein operation (a) is performed in response to operation (f).

3. The method of claim 1, further comprising:
   (f) storing the telemetry data with the associated timestamps in a database.

4. The method of claim 1, wherein:
   the motor parameters indicate phase currents or voltages;
   the computing of (b) comprises performing the averaging analysis or the regression analysis on the phase currents or voltages to determine at least one aging factor.

5. The method of claim 1, wherein the determining of (c) comprises determining at least one failure condition when at least one aging factor exceeds a selected range.

6. The method of claim 1, wherein the motor is one of a Brushless Direct Current (BLDC) motor or a Permanent Magnet Synchronous Motor (PMSM).

7. The method of claim 1, wherein the telemetry data comprises at least one of motor resistance, motor back EMF, and motor inductance.

8. The method of claim 7, wherein the telemetry data is determined from phase currents ($I_U$, $I_V$, $I_W$) and applied voltages ($V_U$, $V_V$, $V_W$) associated with the motor.

9. An apparatus comprising:
   a polling circuit that acquires telemetry data from a motor controller associated with a motor, wherein the telemetry data comprises motor parameters and timestamps associated with the motor parameters;
   an age factor detection circuit that computes aging factors for the motor from the telemetry data and determines failure conditions based on the aging factors, wherein the age factor detection circuit is configured to compute the aging factors by performing an averaging analysis or a regression analysis from the motor parameters and the timestamps associated with the motor parameters; and
   a notification circuit that outputs a notification to a user interface based on the failure conditions.

10. The apparatus of claim 9, further comprising a state machine that controls the polling circuit to acquire the telemetry data at selected time intervals.

11. The apparatus of claim 9, wherein the polling circuit queries a motor controller coupled to the motor to acquire the telemetry data.

12. The apparatus of claim 9, further comprising a database that stores the telemetry data with the timestamps.

13. The apparatus of claim 9, wherein:
    the motor parameters indicate phase currents or voltages;
    the age factor detection circuit performs the averaging analysis or the regression analysis on the phase currents or voltages to determine at least one aging factor.

14. The apparatus of claim 9, wherein the age factor detection circuit determines at least one failure condition when at least one aging factor exceeds a selected range.

15. The apparatus of claim 9, wherein the motor is one of a Brushless Direct Current (BLDC) motor or a Permanent Magnet Synchronous Motor (PMSM).

16. The apparatus of claim 9, wherein the telemetry data comprises at least one of motor resistance, motor back EMF, and motor inductance.

17. The apparatus of claim 16, wherein the motor parameters comprise phase currents ($I_U$, $I_V$, $I_W$) and applied voltages ($V_U$, $V_V$, $V_W$) associated with the motor.

18. An apparatus comprising:
    means for acquiring telemetry data from a motor controller associated with a motor wherein the telemetry data comprises motor parameters and timestamps associated with the motor parameters;
    means for computing aging factors for the motor from the telemetry data, wherein the computing of the aging factors comprises performing an averaging analysis or a regression analysis from the motor parameters and the timestamps associated with the motor parameters;
    means for determining failure conditions of the motor based on the aging factors; and
    means for outputting a notification to a user interface based on the failure conditions.

19. The apparatus of claim 18, wherein:
    the motor parameters indicate phase currents or voltages;
    the means for computing comprises means for performing the averaging analysis or the regression analysis on the phase currents or voltages to determine at least one aging factor.

20. The apparatus of claim 19, wherein the means for determining comprises means for determining at least one failure condition when at least one aging factor exceeds a selected range.

* * * * *